United States Patent
Brown

(10) Patent No.: US 8,694,428 B2
(45) Date of Patent: Apr. 8, 2014

(54) CONSUMER ORIENTED SERVICES SYSTEM AND METHOD

(75) Inventor: David Lawrence Brown, Colorado Springs, CO (US)

(73) Assignee: International Business Machines Corporation, Armonk, NY (US)

(*) Notice: Subject to any disclaimer, the term of this patent is extended or adjusted under 35 U.S.C. 154(b) by 699 days.

(21) Appl. No.: 11/617,634

(22) Filed: Dec. 28, 2006

(65) Prior Publication Data

US 2008/0162294 A1    Jul. 3, 2008

(51) Int. Cl.
*G06Q 40/00*  (2012.01)
(52) U.S. Cl.
USPC .............................. 705/40; 705/38
(58) Field of Classification Search
USPC ................................................ 705/40, 38
See application file for complete search history.

(56) References Cited

U.S. PATENT DOCUMENTS

| | | | | |
|---|---|---|---|---|
| 5,699,528 | A * | 12/1997 | Hogan | 705/40 |
| 6,044,362 | A * | 3/2000 | Neely | 705/34 |
| 7,107,244 | B2 * | 9/2006 | Kight et al. | 705/40 |
| 7,240,031 | B1 * | 7/2007 | Kight et al. | 705/40 |
| 7,302,411 | B2 * | 11/2007 | Ganesan et al. | 705/35 |
| 7,366,696 | B1 * | 4/2008 | Ganesan et al. | 705/40 |
| 7,395,243 | B1 * | 7/2008 | Zielke et al. | 705/40 |
| 7,599,881 | B2 * | 10/2009 | Likourezos et al. | 705/37 |
| 2002/0019808 | A1 * | 2/2002 | Sharma | 705/40 |
| 2004/0015413 | A1 * | 1/2004 | Abu-Hejleh et al. | 705/26 |
| 2005/0065881 | A1 * | 3/2005 | Li et al. | 705/40 |

* cited by examiner

*Primary Examiner* — Justin M Pats
*Assistant Examiner* — Benjamin S Fields
(74) *Attorney, Agent, or Firm* — Holland & Knight LLP; Brian J. Colandreo, Esq.; Jeffrey T. Placker, Esq.

(57) ABSTRACT

A method and computer program product for maintaining, on a first computing device, consumer identification and billing information concerning a user. A directory of ecommerce merchants is maintained on a second computing device. The first computing device and the second computing device are interfaced via a distributed computing network. The user is enabled to select an ecommerce merchant defined within the directory of ecommerce merchants. The order of goods/services from the selected ecommerce merchant to the user using the consumer identification and billing information maintained on the first computing device is facilitated.

20 Claims, 8 Drawing Sheets

CONSUMER ORIENTED SERVICES SYSTEM AND METHOD

TECHNICAL FIELD

This disclosure relates to ecommerce processes and, more particularly, to multi-user ecommerce processes.

BACKGROUND

The internet allows consumers to visit the websites of various merchants and purchase goods and services from those merchants. Unfortunately, navigating the internet may prove difficult, especially when shopping for goods and services that require the merchant to be in close geographic proximity with respect to the consumer.

Additionally, each online merchant may require that the consumer set up an account with them prior to purchasing the goods and services they offer. Therefore, if a consumer is interested in purchasing goods and service from multiple merchants, the consumer may be required to set up an equal number of accounts, enter billing information an equal number of times, enter shipping information an equal number of times, and enter credit card information an equal number of times.

SUMMARY OF DISCLOSURE

In a first implementation of this disclosure, a method includes maintaining, on a first computing device, consumer identification and billing information concerning a user. A directory of ecommerce merchants is maintained on a second computing device. The first computing device and the second computing device are interfaced via a distributed computing network. The user is enabled to select an ecommerce merchant defined within the directory of ecommerce merchants. The order of goods/services from the selected ecommerce merchant to the user using the consumer identification and billing information maintained on the first computing device is facilitated.

One or more of the following features may also be included. Facilitating the order of goods/services may include interfacing, via the distributed computing network, the first computing device with an information resource. The information resource may maintain information, accessible by the first computing device, that at least partially defines the goods/services offered for sale by the selected ecommerce merchant. The information maintained on the information resource may include a website maintained by the selected ecommerce merchant.

Facilitating the order of goods/services may include enabling the user to review the information that at least partially defines the goods/services offered for sale by the selected ecommerce merchant. The user may be enabled to select one or more goods/services for purchase from the selected ecommerce merchant. Facilitating the order of goods/services may include, in response to the user selecting one or more goods/services for purchase, enabling payment from the user to the selected ecommerce merchant for the one or more goods/services purchased using the consumer identification and billing information.

Facilitating the order of goods/services may include maintaining, on the first computing device, an invoice repository. In response to the user selecting one or more goods/services for purchase, an invoice for the selected goods/services may be provided to the first computing device. The invoice may be stored in the invoice repository. The consumer identification and billing information may include one or more of: credit card account information for the user; bank account information for the user; checking account information for the user; billing address information of the user; shipping address information for the user; and contact information for the user.

In another implementation of this disclosure, a method includes maintaining, on a first computing device, consumer identification and billing information concerning a user. The first computing device is enabled to interface with a second computing device that maintains a directory of ecommerce merchants. The user is enabled to select an ecommerce merchant defined within the directory of ecommerce merchants. The order of goods/services from the selected ecommerce merchant to the user using the consumer identification and billing information maintained on the first computing device is facilitated.

One or more of the following features may also be included. Facilitating the order of goods/services may include enabling the first computing device to interface with an information resource. The information resource may maintain information, accessible by the first computing device, that at least partially defines the goods/services offered for sale by the selected ecommerce merchant. Facilitating the order of goods/services may include enabling the user to review the information that at least partially defines the goods/services offered for sale by the selected ecommerce merchant. The user may be enabled to select one or more goods/services for purchase from the selected ecommerce merchant. Facilitating the order of goods/services may include, in response to the user selecting one or more goods/services for purchase, enabling payment from the user to the selected ecommerce merchant for the one or more goods/services purchased using the consumer identification and billing information.

In another implementation of this disclosure, a computer program product includes a computer useable medium having a computer readable program. The computer readable program, when executed on a computer, causes the computer to maintain, on a first computing device, consumer identification and billing information concerning a user. A directory of ecommerce merchants is maintained on a second computing device. The first computing device and the second computing device are interfaced via a distributed computing network. The user is enabled to select an ecommerce merchant defined within the directory of ecommerce merchants. The order of goods/services from the selected ecommerce merchant to the user using the consumer identification and billing information maintained on the first computing device is facilitated.

One or more of the following features may also be included. Facilitating the order of goods/services may include interfacing, via the distributed computing network, the first computing device with an information resource. The information resource may maintain information, accessible by the first computing device, that at least partially defines the goods/services offered for sale by the selected ecommerce merchant. Facilitating the order of goods/services may include enabling the user to review the information that at least partially defines the goods/services offered for sale by the selected ecommerce merchant. The user may be enabled to select one or more goods/services for purchase from the selected ecommerce merchant. Facilitating the order of goods/services may include, in response to the user selecting one or more goods/services for purchase, enabling payment from the user to the selected ecommerce merchant for the one or more goods/services purchased using the consumer identification and billing information.

In another implementation of this disclosure, a computer program product includes a computer useable medium having a computer readable program. The computer readable program, when executed on a computer, causes the computer to maintain, on a first computing device, consumer identification and billing information concerning a user. The first computing device is enabled to interface with a second computing device that maintains a directory of ecommerce merchants. The user is enabled to select an ecommerce merchant defined within the directory of ecommerce merchants. The order of goods/services from the selected ecommerce merchant to the user using the consumer identification and billing information maintained on the first computing device is facilitated.

One or more of the following features may also be included. Facilitating the order of goods/services may include enabling the first computing device to interface with an information resource. The information resource may maintain information, accessible by the first computing device, that at least partially defines the goods/services offered for sale by the selected ecommerce merchant. Facilitating the order of goods/services may include enabling the user to review the information that at least partially defines the goods/services offered for sale by the selected ecommerce merchant. The user may be enabled to select one or more goods/services for purchase from the selected ecommerce merchant. Facilitating the order of goods/services may include, in response to the user selecting one or more goods/services for purchase, enabling payment from the user to the selected ecommerce merchant for the one or more goods/services purchased using the consumer identification and billing information.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Overview:

As will be discussed below in greater detail, this disclosure may take the form of an entirely hardware embodiment, an entirely software embodiment or an embodiment containing both hardware and software elements. In a preferred embodiment, this disclosure may be implemented in software, which may include but is not limited to firmware, resident software, microcode, etc.

Furthermore, this disclosure may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks may include, but are not limited to, compact disc-read only memory (CD-ROM), compact disc-read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories which may provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
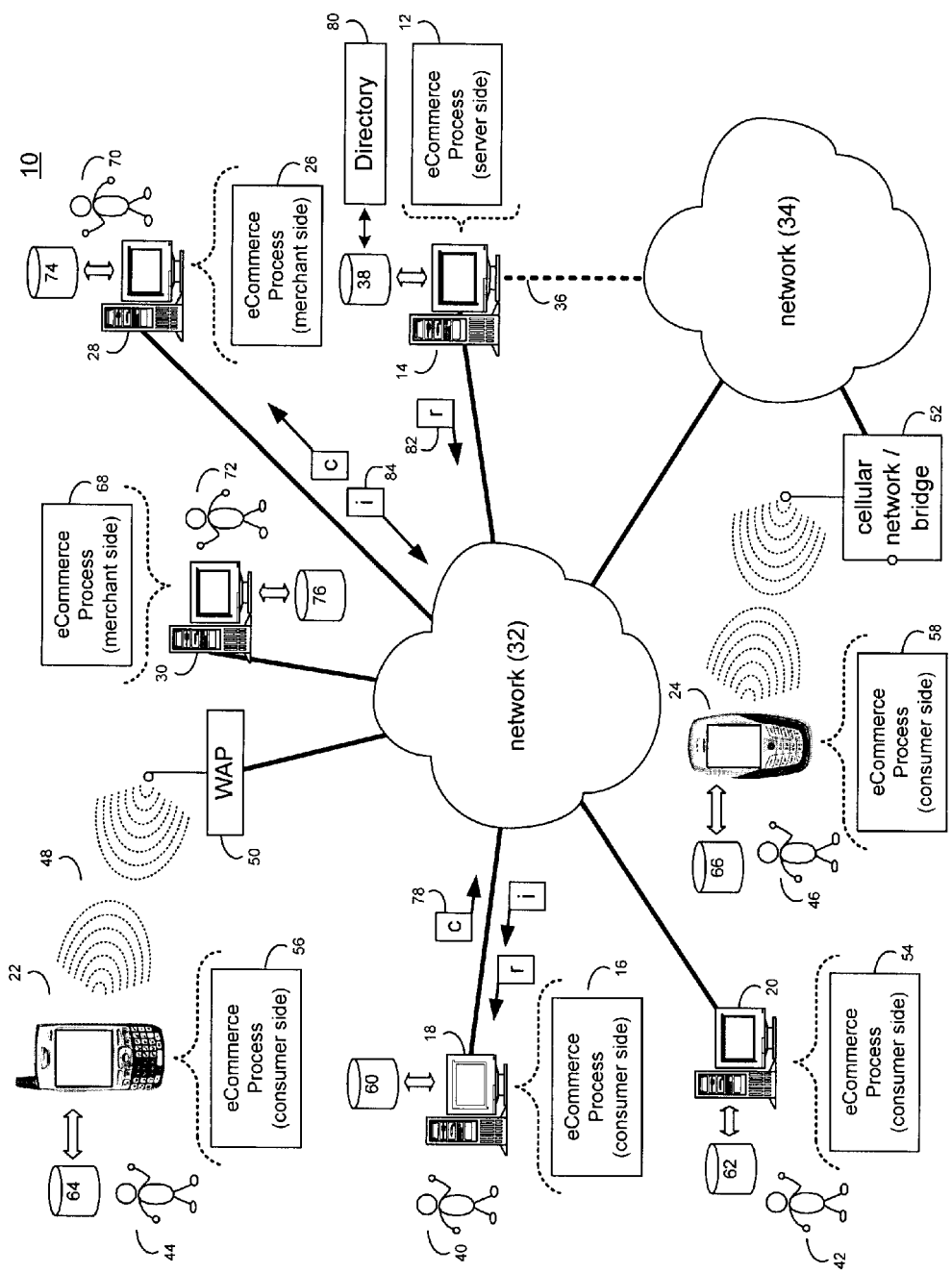
FIG. 1 is a diagrammatic view of an ecommerce process executed in whole or in part by a computer coupled to a distributed computing network.

Referring to FIG. 1, there is shown an ecommerce process 10, which may include a server-side application (e.g., server-side ecommerce process 12) resident on (in whole or in part) and executed by (in whole or in part) server computer 14 (e.g., a single server computer, a plurality of server computers, or a general purpose computer, for example).

Additionally/alternatively, ecommerce process 10 may include a consumer-side application (e.g., consumer-side ecommerce process 16) resident on (in whole or in part) and executed by (in whole of in part) a consumer computing device (e.g., consumer computer 18, consumer computer 20, personal digital assistant 22, data-enabled cellular telephone 24, laptop computers (not shown), notebook computers (not shown), cable boxes (not shown), televisions (not shown), gaming consoles (not shown), and dedicated network appliances (not shown), for example.

Additionally/alternatively, ecommerce process 10 may include a merchant-side application (e.g., merchant-side ecommerce process 26) resident on (in whole or in part) and executed by (in whole of in part) a merchant computing device (e.g., merchant computer 28, merchant computer 30, personal digital assistants (not shown), data-enabled cellular telephones (not shown), laptop computers (not shown), notebook computers (not shown), cable boxes (not shown), televisions (not shown), gaming consoles (not shown), and dedicated network appliances (not shown), for example.

As will be discussed below in greater detail, ecommerce processes 12, 16, 26 (alone or in combination) may allow consumers to research the goods/services offered by a plurality of merchants and order those goods/services using consumer identification and billing information maintained on the consumer's computer.

Server-Side Process:

Server computer 14 may be coupled to distributed computing network 32 (e.g., the Internet). Server computer 14 may be, for example, a web server running a network operating system, examples of which may include but are not limited to Microsoft Windows XP Server™, or Redhat Linux™.

Server computer 14 may also execute a web server application, examples of which may include but are not limited to Microsoft IIS™, or Apache Webserver™, that allows for HTTP (i.e., HyperText Transfer Protocol) access to server computer 14 via network 32. Network 32 may be coupled to one or more secondary networks (e.g., network 34), such as: a local area network; a wide area network; or an intranet, for example. Additionally/alternatively, server computer 14 may be coupled to network 32 through secondary network 34, as illustrated with phantom link line 36.

The instruction sets and subroutines of server-side ecommerce process 12, which may be stored on a storage device 38 coupled to server computer 14, may be executed by one or more processors (not shown) and one or more memory architectures (not shown) incorporated into server computer 14. Storage device 38 may include, but is not limited to, a hard disk drive, a tape drive, an optical drive, a RAID array, a random access memory (RAM), a read-only memory (ROM), a compact flash (CF) storage device, a secure digital (SD) storage device, and a memory stick storage device.

Users 40, 42, 44, 46 may access server-side ecommerce process 12 (directly through network 32 or through secondary network 34) using various computing devices, examples of which may include but are not limited to: consumer computer 18, consumer computer 20, personal digital assistant 22, data-enabled cellular telephone 24, laptop computers (not shown), notebook computers (not shown), cable boxes (not shown), televisions (not shown), gaming consoles (not shown), and dedicated network appliances (not shown), for example.

The various computing devices may be directly or indirectly coupled to network 32 (or network 34). For example, consumer computers 18, 20 are shown directly coupled to network 32 via hardwired network connections. Further, personal digital assistant 22 is shown wirelessly coupled to network 32 via a wireless communication channel 48 established between personal digital assistant 22 and wireless access point (i.e., WAP) 50, which is shown directly coupled to network 32. Additionally, cellular telephone 24 is shown wirelessly coupled to cellular network/bridge 52, which is shown directly coupled to network 34.

WAP 50 may be, for example, an IEEE 802.11a, 802.11b, 802.11g, Wi-Fi, and/or Bluetooth device that is capable of establishing secure communication channel 48 between personal digital assistant 22 and WAP 50.

As is known in the art, all of the IEEE 802.11x specifications use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Consumer-Side Process:

Consumer computers 18, 20, personal digital assistant 22, and data-enabled cellular telephone 24 may each execute a consumer-side ecommerce process (e.g., consumer-side ecommerce processes 16, 54, 56, 58, respectively) that allows e.g., users 40, 42, 44, 46 to access server-side ecommerce process 12. Consumer-side ecommerce processes 16, 54, 56, 58 may be stand-alone applications or may be modules, applets, or plug-ins that operate within other applications. Examples of such other applications may include, but are not limited to, web browser applications such as Microsoft Internet Explorer™, Mozilla Firefox™, and Netscape Navigator™).

Consumer computers 18, 20, personal digital assistant 22, and data-enabled cellular telephone 24 may execute an operating system, examples of which may include but are not limited to Microsoft Windows XP™, Microsoft Windows Mobile™, and Redhat Linux™.

The instruction sets and subroutines of consumer-side ecommerce processes 16, 54, 56, 58, which may be stored on a storage devices 60, 62, 64, 66 (respectively) coupled to consumer computers 18, 20, personal digital assistant 22, and data-enabled cellular telephone 24, may be executed by one or more processors (not shown) and one or more memory architectures (not shown) incorporated into consumer computers 18, 20, personal digital assistant 22, and data-enabled cellular telephone 24. Storage devices 60, 62, 64, 66 may include, but are not limited to, a hard disk drive, a tape drive, an optical drive, a RAID array, a random access memory (RAM), a read-only memory (ROM), a compact flash (CF) storage device, a secure digital (SD) storage device, and a memory stick storage device.

Merchant-Side Process:

Merchant computers 28, 30 may each execute a merchant-side ecommerce process (e.g., merchant-side ecommerce processes 26, 68 respectively) that allows e.g., merchants 70, 72 to access server-side ecommerce process 12, and consumer-side ecommerce processes 16, 54, 56, and 58. Merchant-side ecommerce processes 26, 68 may be stand-alone applications or may be modules, applets, or plug-ins that operate within other applications. Examples of such other applications may include, but are not limited to, web browser applications such as Microsoft Internet Explorer™, Mozilla Firefox™, and Netscape Navigator™).

Merchant computers 28, 30 may execute an operating system, examples of which may include but are not limited to Microsoft Windows XP™, Microsoft Windows Mobile™, and Redhat Linux™.

The instruction sets and subroutines of merchant-side ecommerce processes 26, 68, which may be stored on storage devices 74, 76 (respectively) coupled to merchant computers 28, 30, may be executed by one or more processors (not shown) and one or more memory architectures (not shown) incorporated into merchant computers 28, 30. Storage devices 74, 76 may include, but are not limited to, a hard disk drive, a tape drive, an optical drive, a RAID array, a random access memory (RAM), a read-only memory (ROM), a compact flash (CF) storage device, a secure digital (SD) storage device, and a memory stick storage device.

ECommerce Process Operation:

Ecommerce process 10 (which may include one or more of server-side ecommerce process 12, consumer-side ecommerce process 16, 54, 56, 58, and merchant-side ecommerce processes 26, 68) may allow consumers (e.g., consumers 40, 42, 44, 46) to research the goods/services offered by a plurality of merchants (e.g., merchants 70, 72) and order those goods/services using consumer identification and billing information 78 maintained on the consumer's computer.

Figure 2:
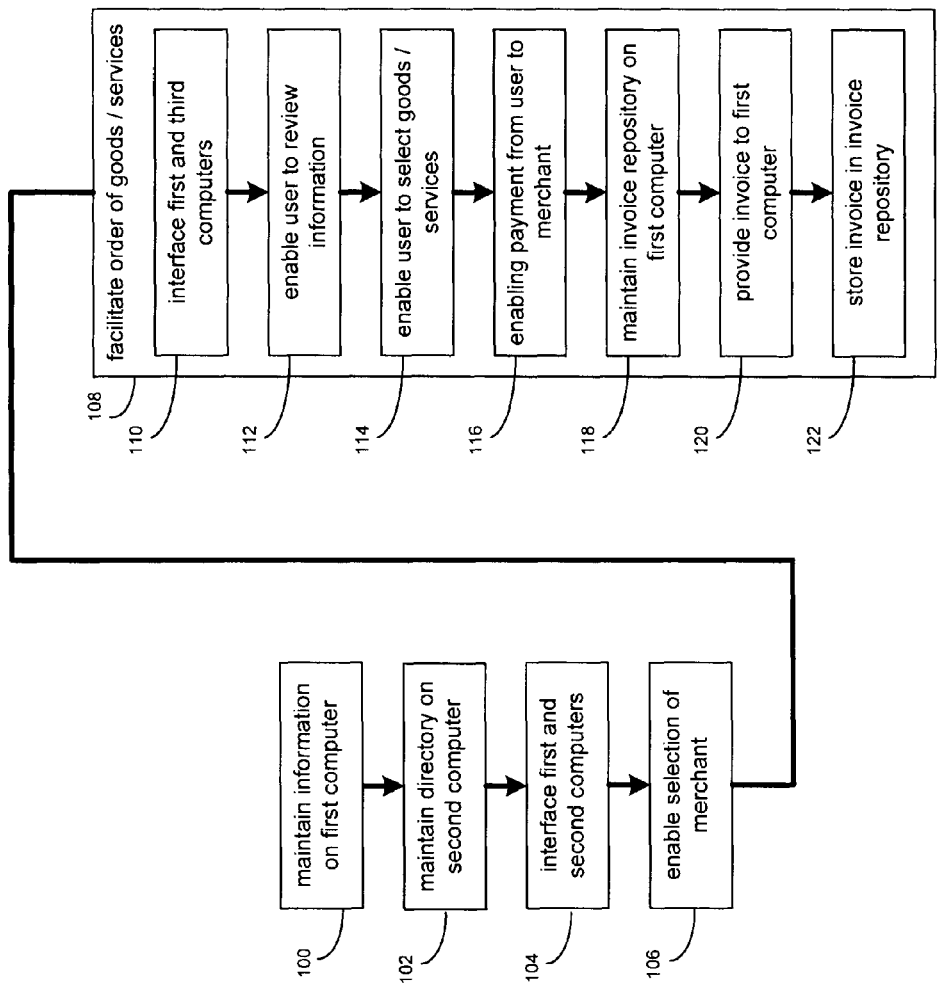
FIG. 2 is a flowchart of the ecommerce process of FIG. 1.
Figure 3:
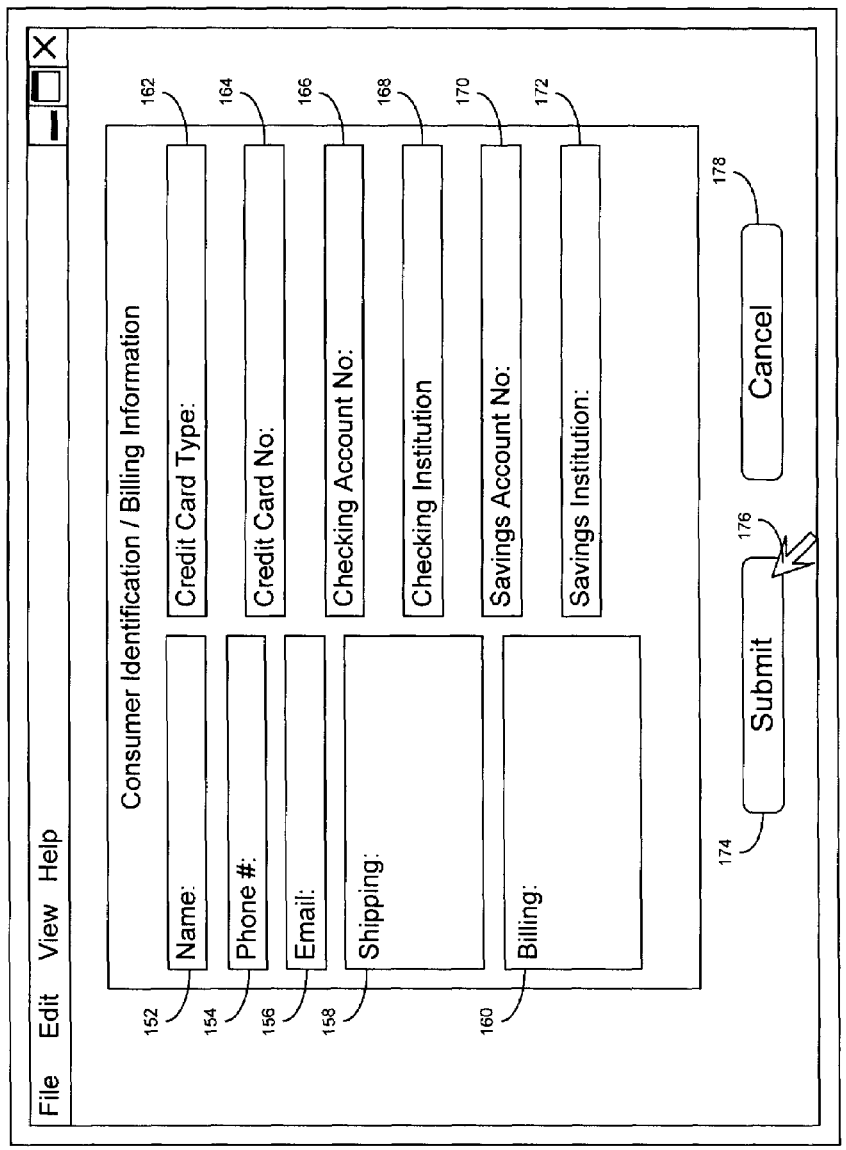
FIG. 3 is a diagrammatic view of a screen rendered (in whole or in part) by the ecommerce process of FIG. 1.

Referring also to FIGS. 2 & 3, ecommerce process 10 may maintain 100, on a first computing device (e.g., consumer computers 18, 20, personal digital assistant 22, and data-enabled cellular telephone 24) consumer identification and billing information 78 concerning a user (e.g., consumer 40, 42, 44, 46). For example, consumer-side ecommerce process 16 (being executed on consumer computer 18) may render consumer identification and billing information screen 150 that allows consumer 40 to define their consumer identification and billing information 78. Consumer identification and billing information screen 150 may include various fields in which e.g., consumer 40 can define various pieces of data. Examples of the various fields may include, but are not limited to, a name field 152 (e.g., for defining the consumer's name); a phone number field 154 (e.g., for defining the consumer's phone number); an email address field 156 (e.g., for defining an email address for the consumer); a shipping address field 158 (e.g., for defining a shipping address for the consumer); a billing address field 160 (e.g., for defining a billing address for the consumer); a credit card type field 162 (e.g., Visa, MasterCard, American Express, Discover); a credit card number field 164 (e.g., for defining a credit card number for the consumer); a checking account field 166 (e.g., for defining a checking account number and routing number for the consumer); a checking institution field 168 (e.g., for defining the bank in which the consumer has a checking account); a savings account field 170 (e.g., for defining a savings account number for the consumer); and a savings institution field 172 (e.g., for defining the bank in which the consumer has a savings account).

Continuing with the above-stated example, once the requisite data is entered into consumer identification/billing information screen 150, consumer 40 may select "Submit" button 174 using screen pointer 176 (which may be controlled by a pointing device such as a mouse, not shown). Further, consumer 40 may select "Submit" button 174 using various other means, such as a keyboard, trackball, stylus, touch screen display, or voice command software. Alternatively, consumer 40 may cancel the procedure by selecting "Cancel" button 178. If "Submit" button 174 is selected, consumer identification and billing information 78 may be saved on e.g., storage device 60 coupled to e.g., consumer computer 18.

Ecommerce process 10 may maintain 102 a directory 80 of ecommerce merchants (e.g., merchants 70, 72) on a second computing device (e.g., server computer 14). For example, directory 80 may define a plurality of merchants that are available to provide goods/service to one or more consumers (e.g., consumers 40, 42, 44, 46). Examples of directory 80 may include, but are not limited to, a searchable database such as an Oracle™ database, an IBM DB2™ database, a Sybase™ database, a Computer Associates™ database, and a Microsoft Access™ database.

Figure 4:
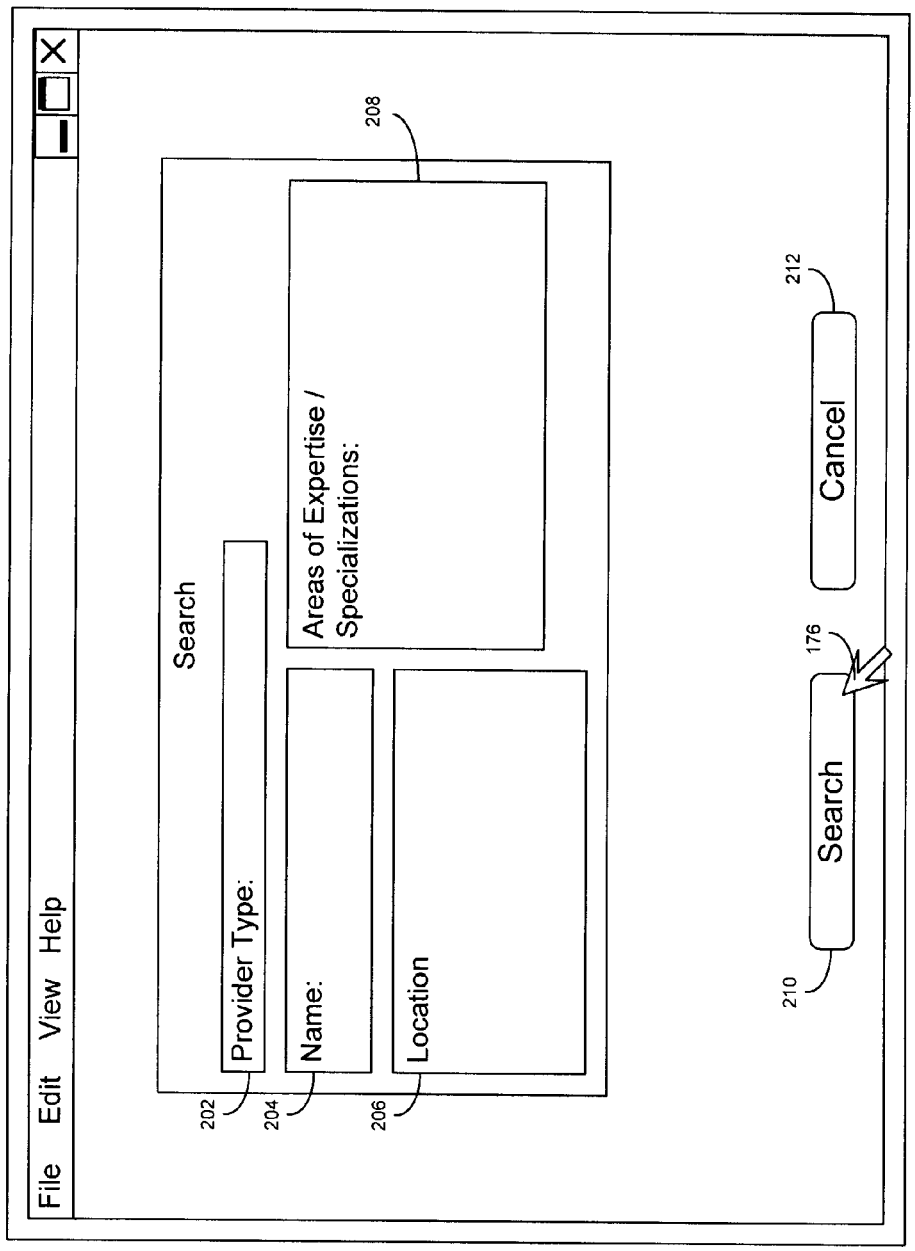
FIG. 4 is a diagrammatic view of a screen rendered (in whole or in part) by the ecommerce process of FIG. 1.

Continuing with the above-stated example and referring also to FIG. 4, consumer-side ecommerce process 16 may render a search screen 200 on consumer computer 18 that allows consumer 40 to formulate queries and search for merchants included within directory 80. Search screen 200 may include various fields in which e.g., consumer 40 can define search terms. Examples of the various fields may include, but are not limited to, a provider type field 202 (e.g., for defining the type of provider, such as landscaper, ticket broker, etc.); a name field 204 (e.g., for defining the name of a particular provider); a location field 206 (e.g., for defining the location of a particular provider, such as city, state, zip code, etc.); and an area of expertise/specializations fields 208 (e.g., which allows the user to define special requirements of the service provider). One or more of the fields (e.g., fields 202, 204, 206, 208) included within search screen 200 may include drop-down menus (250) for allowing e.g. consumer 40 to select one of a plurality of predefined responses.

Figure 5:
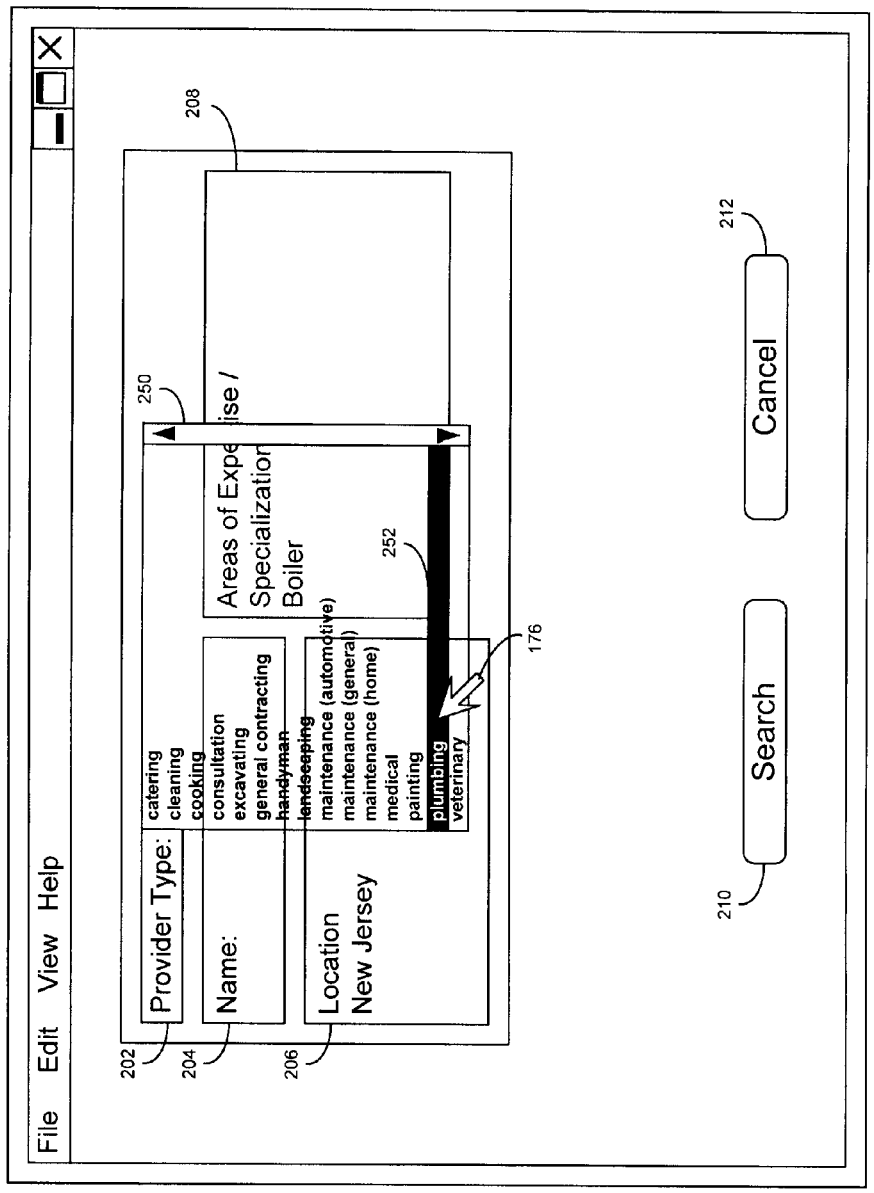
FIG. 5 is a diagrammatic view of a screen rendered (in whole or in part) by the ecommerce process of FIG. 1.

Continuing with the above-stated example and referring also to FIG. 5, assume that consumer 40 is interested in locating a plumber in New Jersey to perform maintenance on their boiler. Consumer 40 may use search screen 200 to define a query for searching for such service providers. Using drop-down menu 250, consumer 40 may select plumbing line item 252 using screen pointer 176. Additionally, consumer 40 may define "New Jersey" in location field 206 and "Boiler" in area of expertise/specializations field 208.

Continuing with the above-stated example, once the requisite data is entered into search screen 200, consumer 40 may select "Submit" button 210 using screen pointer 176. Alternatively, consumer 40 may cancel the procedure by selecting "Cancel" button 212. If "Submit" button 174 is selected, consumer-side ecommerce process 16 may execute a query on directory 80 to define one or more merchants that meet the criteria defined by e.g., consumer 40.

As discussed above, consumer computer 18 (i.e., the computer executing consumer-side ecommerce process 16) and server computer 14 (i.e., the computer executing server-side ecommerce process 12) may be interfaced 104 via e.g., network 32 and/or network 34, thus allowing for the execution of the query (defined by consumer 40 in query search screen 200) on directory 80.

A result set 82 may be generated in response to the query executed on directory 80. Result set 82 may be generated by server-side ecommerce process 12, consumer-side ecommerce process 16, or a combination of both ecommerce processes 12, 16. Result set 82 may be provided from server-side ecommerce process 12 to consumer-side ecommerce process 16 via one or more of networks 32, 34.

Figure 6:
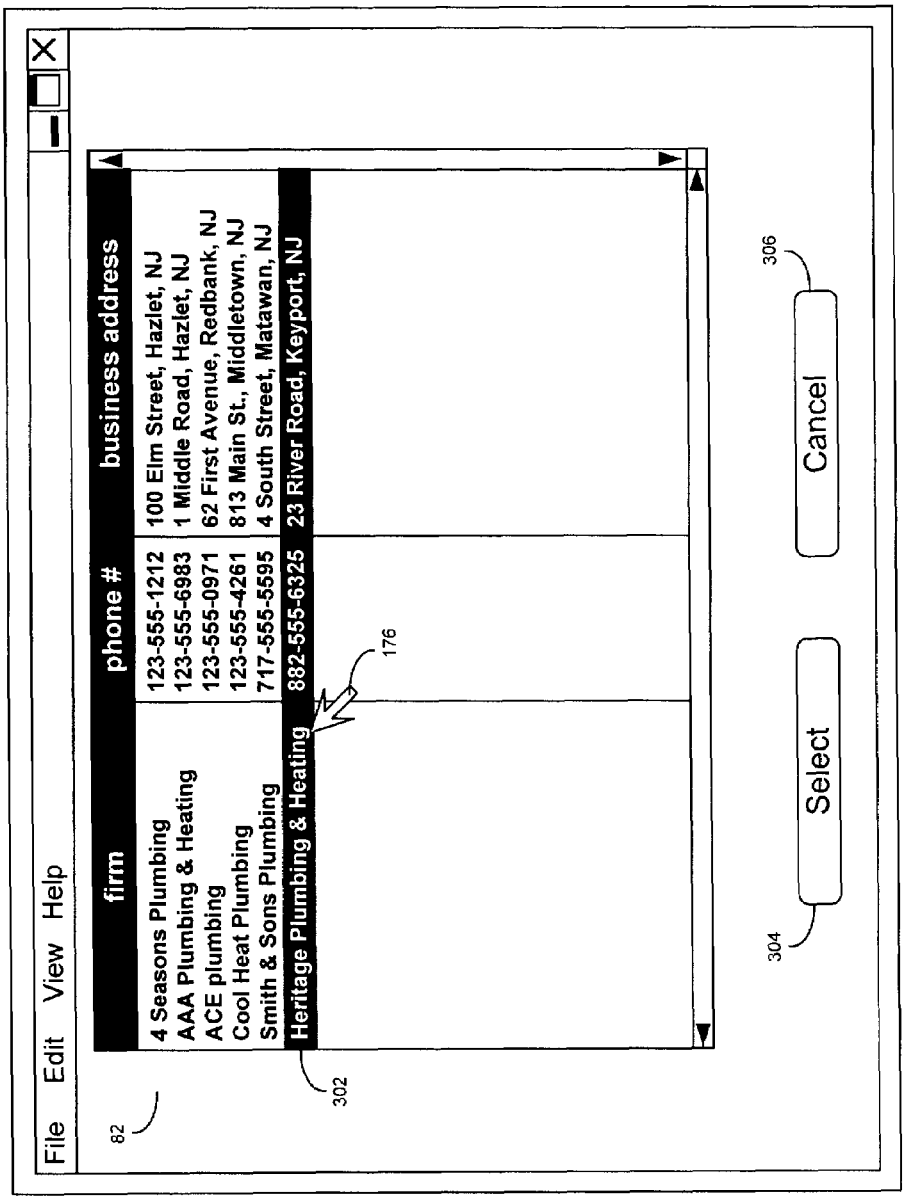
FIG. 6 is a diagrammatic view of a screen rendered (in whole or in part) by the ecommerce process of FIG. 1.

Continuing with the above-stated example, consumer 40 may be enabled 106 to select an ecommerce merchant (e.g., merchants 70, 72) defined within directory 80 of ecommerce merchants. For example and referring also to FIG. 6, consumer-side ecommerce process 16 may render result screen 300. Result screen 300 may be presented to consumer 40 and may itemize result set 82, which was generated in response to consumer 40 executing a query on directory 80. Result set 82 may be a subset of the merchants defined in directory 80. Further, if e.g., consumer 40 did not define any search criteria in search screen 200, result 82 may include all merchants defined within directory 80.

Various line items defined within result set 82 may be rendered differently to indicate to consumer 40 that the consumer has done business with that merchant in the past. For example, one or more line items within result set 82 may be highlighted or rendered in a bold font.

Ecommerce process 10 may facilitate 108 the order of goods/services from the selected ecommerce merchant (e.g., merchants 70, 72) to the user (e.g., consumer 40) using consumer identification and billing information 78 maintained 100 on e.g., consumer computer 18. As discussed above, consumer computer 18 (i.e., the computer executing consumer-side ecommerce process 16) and merchant computer 28 (i.e., the computer executing merchant-side ecommerce process 26) may be interfaced 110 via e.g., network 32 and/or network 34.

Upon reviewing result set 82 with consumer-side ecommerce process 16, consumer 40 may select 108 one or more entries itemized within result set 82. For example, assume that consumer 40 selects 108 item 302 (i.e., the item associated with "Heritage Plumbing & Heating"), resulting in the item being highlighted. Consumer 40 may select "Select" button 304 using screen pointer 176. Alternatively, consumer 40 may cancel the procedure by selecting "Cancel" button 306. If "Select" button 304 is selected, consumer 40 may be directed to information (e.g., a webpage/merchant information screen) that defines the good/services offered by merchant 70 (i.e., Heritage Plumbing & Heating).

Figure 7:
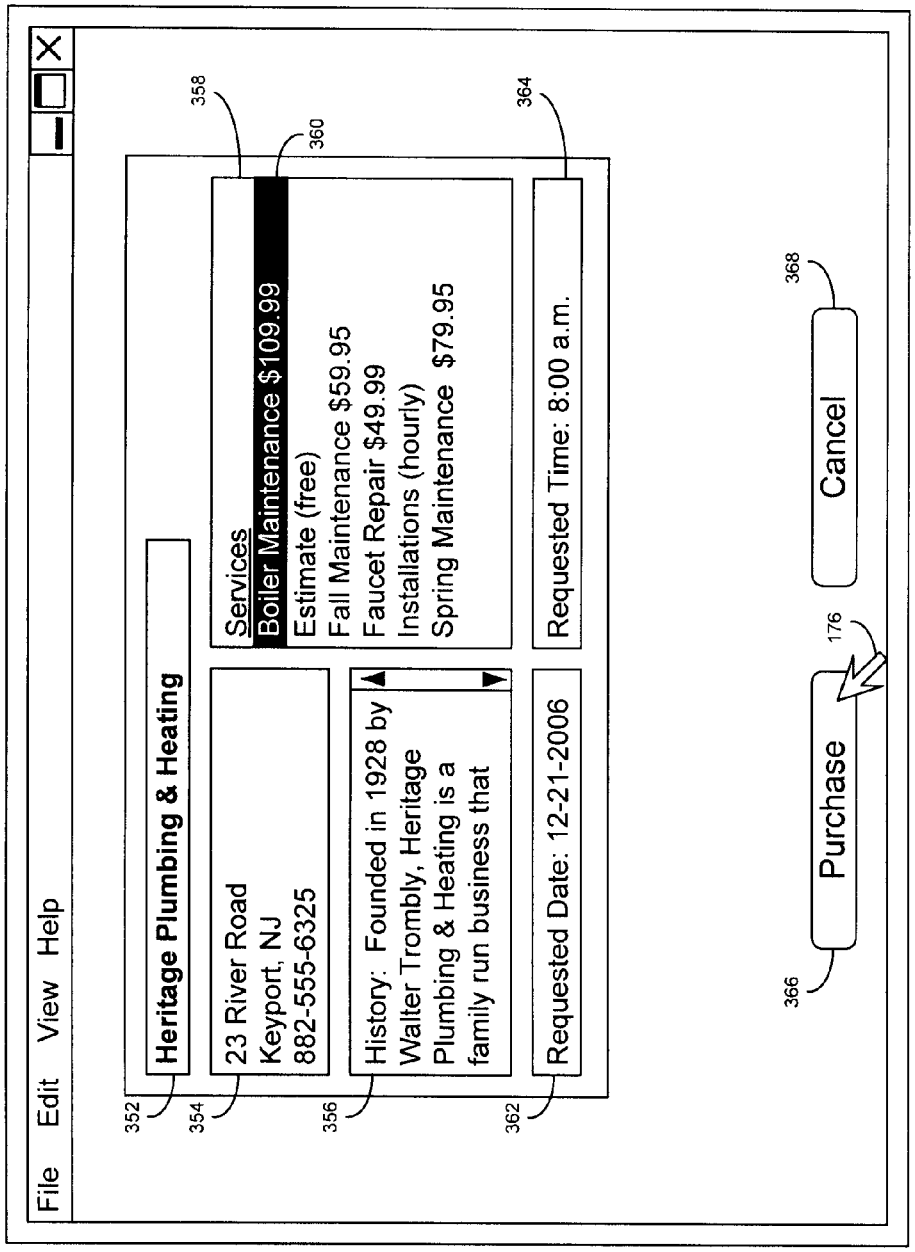
FIG. 7 is a diagrammatic view of a screen rendered (in whole or in part) by the ecommerce process of FIG. 1.

Continuing with the above-stated example and referring also to FIG. 7, merchant computer 28 (i.e., the merchant computer that executes merchant-side ecommerce process 26) may maintain and enable viewing 112 of the above-referenced information (e.g., information screen 350) that at least partially defines the goods/services offered by e.g., merchant 70 (i.e., "Heritage Plumbing & Heating"). Alternatively, information screen 350 may be maintained on and served by e.g., server computer 14 and included within directory 80.

Information screen 350 may be accessed and rendered by consumer-side ecommerce process 16 and presented to consumer 40 for review. As discussed above, information screen 350 may at least partially define the goods/services offered by "Heritage Plumbing & Heating". Accordingly, information screen 350 may include a plurality of fields that may provide information concerning "Heritage Plumbing & Heating". For example, a name field 352 may define the name of the merchant. A contact information field 354 may define e.g., the address and telephone number of the merchant. A history field 356 may describe the history of the merchant. A services field 358 may define one or more services (and respective prices) offered by the merchant. Consumer 40 may review the services offered by the merchant and select (using screen pointer 176) one of the services. For example, and as discussed above, according to the search criteria entered into search screen 200, consumer 40 is interested in having their boiler serviced. Accordingly, consumer 40 may select 114 item 360 (included within field 358, namely "Boiler Maintenance $109.99"). Consumer 40 may then enter a date for the service call into date field 362. Consumer 40 may also enter a time for the service call into time field 364. Alternatively, one or more of the fields 362, 364 may be left blank and, therefore, consumer 40 may be assigned the next available date and/or time.

Additionally/alternatively, consumer 40 may be required to populate a supplemental information screen (not shown) that requests information specific to the good/service selected. For example, when consumer 40 selects "Boiler Maintenance", a supplemental information screen (not shown) may be rendered that requests e.g., the type of boiler (i.e., oil, natural gas, propane) and the make/model of boiler, for example.

Further, information screen 350 may include a hyperlink to an external website (not shown) maintained by the merchant that may provide additional information concerning the merchant. Information screen 350 may define a consumer specific transaction history (not shown) for e.g., merchant 70 (i.e., "Heritage Plumbing & Heating") and e.g., consumer 40. Additionally, information screen 350 may allow a consumer (e.g., consumer 40) to leave comments concerning the subject merchant (e.g., highly recommended, or do not use)

Continuing with the above-stated example, once the requisite data is entered into information screen 350, consumer 40 may select "Purchase" button 366 using screen pointer 176. Alternatively, consumer 40 may cancel the procedure by selecting "Cancel" button 368. If "Purchase" button 366 is selected, consumer-side ecommerce process 16 and merchant-side ecommerce process 26 may exchange the various pieces of information required to enable 116 payment from e.g., consumer 40 to e.g., merchant 70 (i.e., Heritage Plumbing & Heating) for the "Boiler Maintenance" service purchased. Concerning the various pieces of information exchanged between processes 16, 26, consumer-side ecommerce process 16 may provide merchant-side ecommerce process 26 with consumer identification and billing information 78 and e.g., the information entered into information screen 350. Merchant 70 may use the information entered into information screen 350 to schedule the boiler service call (e.g., using date field 362 and time field 364) and determine the type of service call (e.g., using services field 358). The address of the service call may be obtained from shipping address field 158 of consumer identification/billing information screen 150. Further, the information required to effectuate payment may be obtained from one or more of several fields (e.g., fields 162, 164 166, 168, 170, 172) also included within consumer identification/billing information screen 150.

Figure 8:
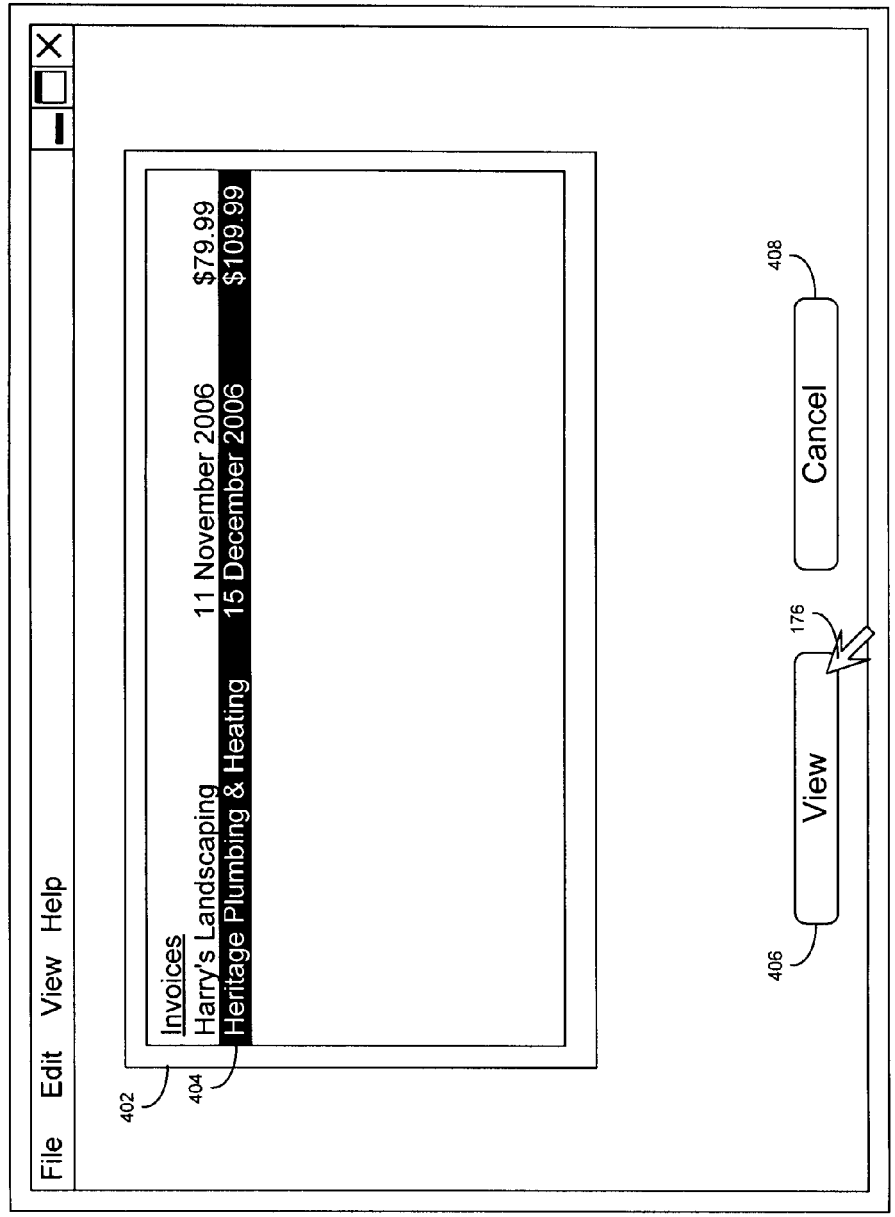
FIG. 8 is a diagrammatic view of a screen rendered (in whole or in part) by the ecommerce process of FIG. 1

Continuing with the above-stated example and referring also to FIG. 8, consumer-side ecommerce process 16 may maintain 118 on e.g., consumer computer 18 (e.g., the computer that executes consumer-side ecommerce process 16) an invoice repository (not shown). Merchant-side ecommerce process 26 may generate an invoice 84 that defines some or all of the above-referenced data and provides 120 the invoice to e.g., consumer computer 18 (via one or more of networks 32, 34). Upon receiving invoice 84, consumer-side ecommerce process 16 may store 122 invoice 84 in the invoice repository (not shown). Consumer 40 may review the invoices stored in the invoice repository (not shown) using invoice repository screen 400, which may be rendered by consumer-side ecommerce process 16. Invoice repository screen 400 may include an invoice summary field 402 that itemizes the invoices stored in the invoice repository.

Continuing with the above-stated example, if e.g., consumer 40 wishes to review the invoice from "Heritage Plumbing & Heating" for the "Boiler Maintenance", consumer 40 may highlight invoice item 404 (i.e., the item associated with the appropriate "Heritage Plumbing & Heating" invoice and select "View" button 406, which may result in the appropriate "Heritage Plumbing & Heating" invoice being rendered by consumer-side ecommerce process 16 for review by e.g., consumer 40. Alternatively, consumer 40 may cancel the procedure by selecting "Cancel" button 408.

While directory 80 is described above as being a database that is searchable via search screen 200, other configurations are possible and are considered to be within the scope of this disclosure. For example, directory 80 may be a static webpage (not shown) served by server-side process 12 and viewable by e.g., consumer-side process 16. This static webpage (not shown) may include a plurality of hyperlinks that direct consumer 40 to merchant webpages (e.g., information screen 350) maintained by the individual merchants (e.g., merchants 70, 72).

While the example described above concerns the purchasing of services (namely a "Boiler Maintenance" service), other configuration are possible and are considered to be within the scope of this disclosure. For example, ecommerce process 10 may be configured to allow for purchasing of products from merchants. In such an embodiment, information screen 350 may define one or more products offered for sale by the merchant, each of which may be selectable by the consumer viewing information screen 350.

A number of implementations have been described. Nevertheless, it will be understood that various modifications may be made. Accordingly, other implementations are within the scope of the following claims.

What is claimed is:

1. A method comprising:
maintaining, on a first computing device, consumer identification and billing information concerning a user, the first computing device distinct from at least one merchant computing device;
maintaining, on a second computing device, a directory of ecommerce merchants, each ecommerce merchant corresponding to the at least one merchant computing device, the second computing device being distinct from the at least one merchant computing device;
interfacing, via a distributed computing network, the first computing device and the second computing device;
generating, on the second computing device, a list of goods/services provided by one or more ecommerce merchants within the directory of ecommerce merchants;
enabling the user to select one or more goods/services from the list of goods/services;
facilitating an order of the selected goods/services from the one or more ecommerce merchants to the user using the consumer identification and billing information maintained on the first computing device;
interfacing, via the distributed computing network, the first computing device, with an information resource located on the second computing device, wherein the information resource maintains information, accessible by the first computing device, that at least partially defines the goods/services offered for sale by the selected ecommerce merchant;
generating, on the first computing device, an information screen including the information that at least partially defines the goods/services offered for sale by the selected ecommerce merchant; and
generating, on the first computing device, a supplemental information screen that requests information from the user specific to a selected good/service.

2. The method of claim 1 wherein the information maintained on the information resource includes a website maintained by the selected ecommerce merchant.

3. The method of claim 1 wherein facilitating the order of goods/services further includes:
enabling the user to review the information that at least partially defines the goods/services offered for sale by the selected ecommerce merchant; and
enabling the user to select one or more goods/services for purchase from the selected ecommerce merchant.

4. The method of claim 3 wherein facilitating the order of goods/services further includes:
in response to the user selecting one or more goods/services for purchase, enabling payment from the user to the selected ecommerce merchant for the one or more goods/services purchased using the consumer identification and billing information.

5. The method of claim 3 wherein facilitating the order of goods/services further includes:
maintaining, on the first computing device, an invoice repository;
in response to the user selecting one or more goods/services for purchase, providing an invoice for the selected goods/services to the first computing device; and
storing the invoice in the invoice repository.

6. The method of claim 3 wherein the consumer identification and billing information includes one or more of:
credit card account information for the user;
bank account information for the user;
checking account information for the user;
billing address information of the user;
shipping address information for the user; and
contact information for the user.

7. The method of claim 1 further comprising:
enabling the user to search the directory of ecommerce merchants for goods/services by entering a search criteria of goods/services; and
generating, on the second computing device, a list of goods/services matching the search criteria of goods/services.

8. The method of claim 1 wherein the information screen includes a service date field and a service time field.

9. The method of claim 1 further comprising:
assigning a next available date and time to a customer.

10. A method comprising:
maintaining, on a first computing device, consumer identification and billing information concerning a user, the first computing device distinct from at least one merchant computing device;
enabling the first computing device to interface with a second computing device that maintains a directory of ecommerce merchants, each ecommerce merchant corresponding to the at least one merchant computing device, the second computing device being distinct from the at least one merchant computing device;
generating, on the second computing device, a list of goods/services provided by one or more ecommerce merchants within the directory of ecommerce merchants;
enabling the user to select one or more goods/services from the list of goods/services;
facilitating an order of the selected goods/services from the one or more ecommerce merchants to the user using the consumer identification and billing information maintained on the first computing device;
enabling the first computing device to interface with an information resource, wherein the information resource is located on the second computing device maintains information, accessible by the first computing device, that at least partially defines the goods/services offered for sale by the selected ecommerce merchant;
generating, on the first computing device, an information screen including the information that at least partially defines the goods/services offered for sale by the selected ecommerce merchant; and
generating, on the first computing device a supplemental information screen that requests information from the user specific to a selected good/service.

11. The method of claim 10 wherein facilitating the order of goods/services further includes:
enabling the user to review the information that at least partially defines the goods/services offered for sale by the selected ecommerce merchant; and
enabling the user to select one or more goods/services for purchase from the selected ecommerce merchant.

12. The method of claim 10 wherein facilitating the order of goods/services further includes:
in response to the user selecting one or more goods/services for purchase, enabling payment from the user to the selected ecommerce merchant for the one or more goods/services purchased using the consumer identification and billing information.

13. A computer program product comprising a computer useable medium including a computer readable program, wherein the computer readable program when executed on a computer causes the computer to:

maintain, on a first computing device, consumer identification and billing information concerning a user, the first computing device distinct from at least one merchant computing device;

maintain, on a second computing device, a directory of ecommerce merchants, each ecommerce merchant corresponding to the at least one merchant computing device, the second computing device being distinct from the at least one merchant computing device;

interface, via a distributed computing network, the first computing device and the second computing device;

generate, on the second computing device, a list of goods/services provided by one or more ecommerce merchants within the directory of ecommerce merchants;

enable the user to select one or more goods/services from the list of goods/services;

facilitate an order of the selected goods/services from the one or more ecommerce merchants to the user using the consumer identification and billing information maintained on the first computing device;

interface, via the distributed computing network, the first computing device with an information resource located on the second computing device, wherein the information resource maintains information, accessible by the first computing device, that at least partially defines the goods/services offered for sale by the selected ecommerce merchant;

generate, on the first computing device, an information screen including the information that at least partially defines the goods/services offered for sale by the selected ecommerce merchant; and generate, on the first computing device, a supplemental information screen that requests information from the user specific to a selected good/service.

14. The computer program product of claim 13 wherein facilitating the order of goods/services further includes:
enabling the user to review the information that at least partially defines the goods/services offered for sale by the selected ecommerce merchant; and
enabling the user to select one or more goods/services for purchase from the selected ecommerce merchant.

15. The computer program product of claim 14 wherein facilitating the order of goods/services further includes:
in response to the user selecting one or more goods/services for purchase, enabling payment from the user to the selected ecommerce merchant for the one or more goods/services purchased using the consumer identification and billing information.

16. The computer program product of claim 13 wherein the information screen includes a service date field and a service time field.

17. The computer program product of claim 13 wherein facilitating the order of goods/services further includes:
assigning a next available date and time to a customer.

18. A computer program product comprising a computer useable medium including a computer readable program, wherein the computer readable program when executed on a computer causes the computer to:
maintain, on a first computing device, consumer identification and billing information concerning a user, the first computing device distinct from at least one merchant computing device;

enable the first computing device to interface with a second computing device that maintains a directory of ecommerce merchants, each ecommerce merchant corresponding to the at least one merchant computing device, the second computing device being distinct from the at least one merchant computing device;

generate, on the second computing device, a list of goods/services provided by one or more ecommerce merchants within the directory of ecommerce merchants;

enable the user to select one or more goods/services from the list of goods/services;

facilitate an order of the selected goods/services from the one or more ecommerce merchants to the user using the consumer identification and billing information maintained on the first computing device;

enable the first computing device to interface with an information resource, wherein the information resource is located on the second computing device and maintains information, accessible by the first computing device, that at least partially defines the goods/services offered for sale by the selected ecommerce merchant;

generate, on the first computing device, an information screen including the information that at least partially defines the goods/services offered for sale by the selected ecommerce merchant; and generate, on the first computing device, a supplemental information screen that requests information from the user specific to a selected good/service.

19. The computer program product of claim 18 wherein facilitating the order of goods/services further includes:
enabling the user to review the information that at least partially defines the goods/services offered for sale by the selected ecommerce merchant; and
enabling the user to select one or more goods/services for purchase from the selected ecommerce merchant.

20. The computer program product of claim 19 wherein facilitating the order of goods/services further includes:
in response to the user selecting one or more goods/services for purchase, enabling payment from the user to the selected ecommerce merchant for the one or more goods/services purchased using the consumer identification and billing information.

* * * * *